United States Patent
Jacobs

(10) Patent No.: US 9,262,637 B2
(45) Date of Patent: Feb. 16, 2016

(54) SYSTEM AND METHOD FOR VERIFYING INTEGRITY OF PLATFORM OBJECT USING LOCALLY STORED MEASUREMENT

(75) Inventor: William E. Jacobs, Beaverton, OR (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 13/434,535

(22) Filed: Mar. 29, 2012

(65) Prior Publication Data

US 2013/0263205 A1 Oct. 3, 2013

(51) Int. Cl.
*H04L 29/06* (2006.01)
*G06F 21/57* (2013.01)
*G06F 9/30* (2006.01)
*H04L 9/08* (2006.01)

(52) U.S. Cl.
CPC ............ *G06F 21/57* (2013.01); *G06F 9/30101* (2013.01); *H04L 9/0877* (2013.01)

(58) Field of Classification Search
CPC ...... G06F 21/57; G06F 21/575; H04L 9/0877
USPC .......................................................... 726/1
See application file for complete search history.

(56) References Cited

U.S. PATENT DOCUMENTS

| | | | |
|---|---|---|---|
| 2003/0084342 A1* | 5/2003 | Girard | 713/201 |
| 2003/0188146 A1* | 10/2003 | Hale | G06F 9/30101 713/1 |
| 2004/0024917 A1* | 2/2004 | Kennedy et al. | 710/1 |
| 2004/0073806 A1 | 4/2004 | Zimmer | |
| 2004/0177265 A1* | 9/2004 | Ice et al. | 713/200 |
| 2005/0132177 A1* | 6/2005 | Challener et al. | 713/1 |
| 2005/0289347 A1* | 12/2005 | Ovadia | H04L 9/0877 713/171 |
| 2006/0010326 A1* | 1/2006 | Bade et al. | 713/176 |
| 2006/0155988 A1* | 7/2006 | Hunter et al. | 713/164 |
| 2007/0061535 A1 | 3/2007 | Xu et al. | |
| 2008/0126782 A1* | 5/2008 | Dayan et al. | 713/2 |
| 2009/0172639 A1* | 7/2009 | Natu et al. | 717/120 |
| 2009/0222653 A1* | 9/2009 | Findeisen et al. | 713/2 |
| 2010/0185845 A1* | 7/2010 | Takayama et al. | 713/2 |
| 2012/0079259 A1* | 3/2012 | Swanson et al. | 713/2 |
| 2012/0084549 A1* | 4/2012 | Mackintosh et al. | 713/2 |

FOREIGN PATENT DOCUMENTS

WO WO2011/146305 11/2011

OTHER PUBLICATIONS

EPO-2013-8-30-2013 European Search Report and Written Opinion from European Application No. EP13160032.
PRC Jun. 3, 2015 First SIPO Office Action from Chinese Application Serial No. 20130102605.7.

* cited by examiner

*Primary Examiner* — Izunna Okeke
*Assistant Examiner* — Bryan Wright
(74) *Attorney, Agent, or Firm* — Patent Capital Group

(57) ABSTRACT

A method is provided in one example embodiment that includes storing a reference measurement of an object in a trusted storage and retrieving the reference measurement from the trusted storage before an operating system is loaded. In a pre-operating system environment, the reference measurement can be compared with a golden measurement and a policy action can be applied if a variance is detected between the reference measurement and the golden measurement. In more particular embodiments, the reference measurement is a measurement of firmware, and yet more particularly, the measurement is a hash of the firmware.

17 Claims, 6 Drawing Sheets

SYSTEM AND METHOD FOR VERIFYING INTEGRITY OF PLATFORM OBJECT USING LOCALLY STORED MEASUREMENT

TECHNICAL FIELD

This disclosure relates in general to information system security, and more particularly, to a system and a method for trusted platform attestation.

BACKGROUND

Computing platforms commonly rely on a Basic Input/Output System (BIOS) to initialize hardware during startup. The BIOS is generally configurable firmware, and it is a critical security component in computing platforms because of its unique and privileged position within the architecture. If the BIOS code or configuration is altered from the intended state, either maliciously or accidentally, the computing platform may experience losses of confidentiality, integrity, and availability, including system instability, system failure, and information leakage. A platform may also be vulnerable to more elaborate attacks such as covert monitoring, where the platform could be used as a stepping-stone for attacking other systems. Thus, establishing a secure BIOS integrity measurement and reporting chain is a substantial concern for equipment manufacturers, developers, and operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment that includes storing a reference measurement of an object in a trusted storage and retrieving the reference measurement from the trusted storage before an operating system is loaded. In a pre-operating system environment, the reference measurement can be compared (e.g., evaluated, analyzed, matched, etc.) with a golden measurement and a policy action can be applied if a variance is detected between the reference measurement and the golden measurement. Any suitable policy action can be implemented in such a context. In more particular embodiments, the reference measurement is a measurement of firmware, such as a BIOS, and yet more particularly, the measurement can be a hash of the firmware. Alternatively, such measurements can be any other suitable object, electronic element, or resultant associated with certain processing by a microcontroller.

In some example embodiments, the golden measurement is a stored locally such that it may be accessed without a network connection. In alternative embodiments, the golden measurement can be stored in a system manager accessible only through a local area network connection, such as in a datacenter environment. In yet other embodiments, the method may also include querying the system manager to determine the location of the golden measurement.

Example Embodiments

Figure 1:
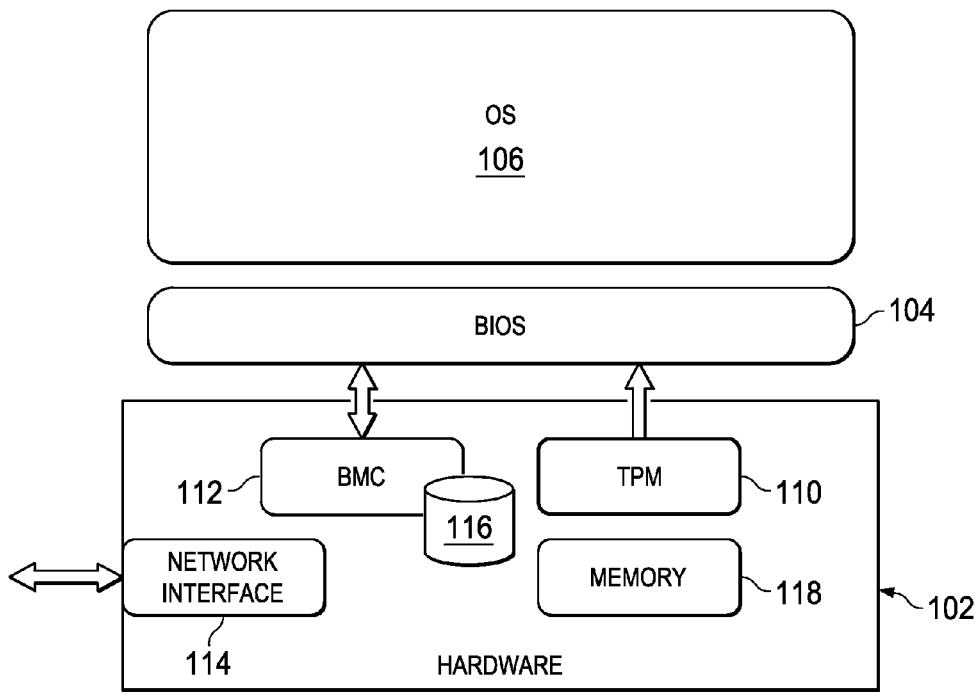
FIG. 1 is a simplified block diagram illustrating an example embodiment of a computing system in which attestation of a trusted platform may be provided in accordance with this disclosure.

Turning to FIG. 1, FIG. 1 is a simplified block diagram of an example embodiment of a computing system 100 in which attestation of a trusted platform may be provided in accordance with this disclosure. Computing system 100 generally includes an instance of the hardware 102 and a BIOS 104. Computing system 100 may also include software, such as an operating system 106, and peripheral devices (not shown). Hardware 102 may provide a trusted platform module (TPM) 110, a baseboard management controller (BMC) 112, a network interface 114, a data store 116, and other memory elements, such as memory 118.

Computing system 100 may be representative of any type of server, desktop computer, laptop computer, tablet computer, or any other type of machine, apparatus, endpoint, end-user device, or system capable of performing logic operations on data. Such operations may, for example, be implemented with a processor (such as may be found in BMC 112) that executes instructions contained in (and read from) a memory element (e.g., memory 118). Such instructions may be read into the memory element from another medium, such as a removable storage medium. In another example, instructions may be read from a remote memory element through network interface 114.

In general terms, BIOS 104 provides a firmware interface between hardware 102 and other components of computing system 100, including software, peripheral devices, and other firmware. BIOS 104 may execute a power-on self-test (POST), which can identify and initialize other components. BIOS 104 can also locate and transfer execution to boot loader software, which can load an operating system (e.g., operating system 106). BIOS 104 also may provide a library of basic input/output functions used to operate and control other components.

BMC 112 generally represents a component of an intelligent platform management interface, which provides an interface for managing and monitoring a computer system. In one example, BMC 112 may be a microcontroller or application specific integrated circuit (ASIC) embedded on a motherboard of computer system 100. BMC 112 may connect to satellite controllers or another BMC in another chassis via a bus or bridge, and it may be managed remotely. Physically, other components may interface with BMC 112 through busses, serial consoles, and/or data lines, for example. Different types of sensors in computer system 100 can report to BMC 112 on parameters such as temperature, cooling fan speeds, power status, operating system (OS) status, etc. BMC 112 can monitor the sensors and send alerts to a system administrator via network interface 114 or a console if any of the parameters do not stay within preset limits, indicating a potential failure of the system. An administrator can also remotely communicate with BMC 112 to take some corrective action such as resetting or power cycling the system.

A trusted platform module such as TPM 110 generally offers facilities for the secure generation of cryptographic keys, and limitation of their use, in addition to a hardware pseudo-random number generator. It can also provide capabilities such as trusted storage. As used here, "trusted storage" is any isolated, protected, shielded, or sealed memory element, including write-once registers such as platform configuration registers (PCRs). A trusted platform module may contain several PCRs that allow secure storage and reporting of security-relevant metrics. Together with a BIOS, a trusted platform module can form a "root of trust." In one particular example embodiment, TPM 110 may be implemented as a microcontroller according to published standards, such as the specification published by the Trusted Computing Group or the International Organization for Standards (ISO)/International Electrotechnical Commission (IEC) (e.g., ISO/IEC 11889), or implemented in any other suitable fashion.

For purposes of illustrating certain example embodiments of computing system 100, it is important to understand certain contextual information. Such information is offered earnestly and for teaching purposes only and, therefore, should not be construed in any way to limit the broad applications of the present disclosure. BIOS integrity measurement is a security mechanism that provides the ability to detect changes to platform firmware, software, or other objects through measurements, which may be used to ensure that objects in a computing system have not been accidentally or maliciously altered. A "measurement" in this context may, for example, be a hash of an object, such as a firmware image. In some implementations, a third-party attestation service may be provided with "golden" measurements of objects that can be compared with measurements taken by a BIOS, where the term "golden" generally implies that the measurements have some out-of-band guarantee of integrity. For example, measurements provided directly by a manufacturer may be acceptable as golden measurements.

An agent running under an operating system can capture measurements from a computing system, store them in a trusted platform module, and send them to the attestation service for comparison. A difference or variance between a captured measurement and a corresponding golden measurement may be indicative of an altered object, and a platform policy may be applied accordingly. For example, a BIOS may enforce some remedial action, such as re-flashing, sequestering/quarantining, or prompting a service call. However, an agent running under an operating system cannot completely eliminate the risk of running or accessing a compromised object, since the operating system should be loaded before the agent can capture the measurement or communicate with an attestation service.

In accordance with embodiments disclosed herein, computing system 100 can overcome these shortcomings (and others) by providing a system and method for real-time, out-of-band attestation of platform objects including firmware, software, configuration files, and/or any other data structure. More particularly, in certain embodiments a trusted execution technology (TXT) compliant BIOS, operating system loader, or operating system may place reference measurements in trusted storage, such as registers (e.g., PCRs) of a trusted platform module, and a BIOS can retrieve the reference measurements during POST, as well as during operating system boot or run-time. The BIOS can pass the measurements to an integrated circuit such as a BMC, for example, which can compare the reference measurements to golden measurements. In some example embodiments, the golden measurements may be stored locally. In other embodiments, the golden measurements may additionally (or alternatively) be stored in a remote system manager or management module. In yet other example embodiments, golden measurements may additionally (or alternatively) be stored in a third-party attestation server.

Thus, computing system 100 may have many applications, such as checking option read-only memory (OROM) code in peripheral component cards (e.g., Peripheral Component Interconnect Express cards), checking BIOS setup configuration remotely to confirm that setting have not been changed, and checking BIOS settings and the platform configuration to facilitate debugging, for example.

Figure 2:
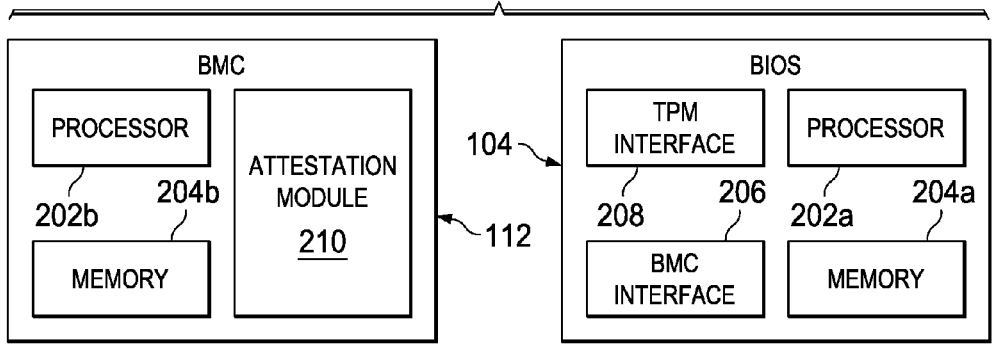
FIG. 2 is a simplified block diagram illustrating additional details that may be associated with example embodiments of a BIOS and a microcontroller in the computing system.

Turning to FIG. 2, FIG. 2 is a simplified block diagram 200 illustrating additional details that may be associated with example embodiments of BIOS 104 and BMC 112. In one example embodiment, BIOS 104 may include a processor 202a and a memory 204a, and BMC 112 may be implemented as a microcontroller with a processor 202b and a memory 204b. BIOS 104 may additionally include a BMC interface 206 and a TPM interface 208. BMC 112 may include an attestation module 210. Each of BIOS 104 and BMC 112 may include additional hardware, firmware, and/or software elements to facilitate operations described herein, and can also be configured to store, aggregate, process, export, and/or otherwise maintain data in any appropriate format, where these activities can involve processors 202a-202b and/or memory element 204a-204b, for example.

Figure 3:
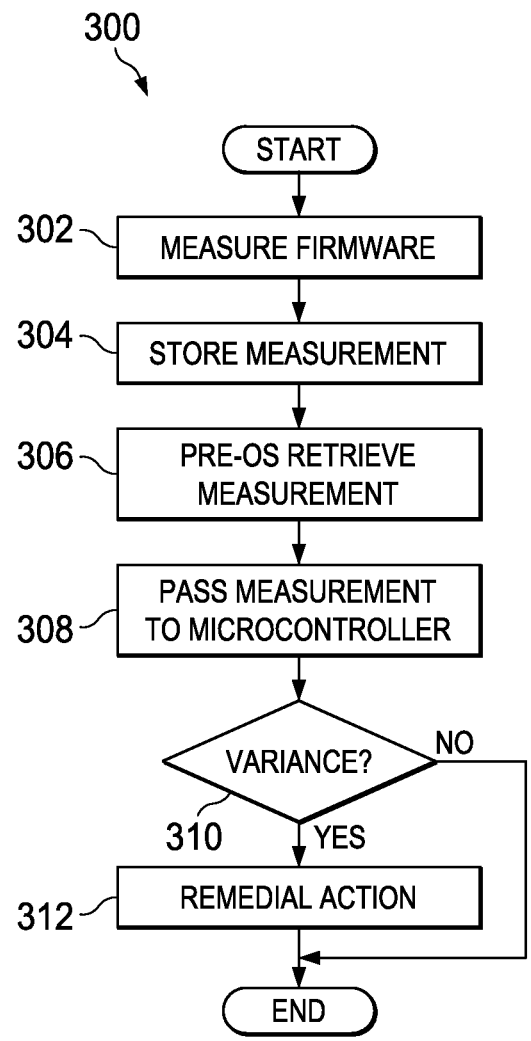
FIG. 3 is a simplified flow diagram illustrating potential operations that may be associated with example embodiments of the computing system.

FIG. 3 is a simplified flow diagram 300 illustrating potential operations that may be associated with example embodiments of computing system 100. Such operations may, for example, be implemented in a BIOS and a BMC, such as BIOS 104 and BMC 112.

As a preliminary matter, a golden measurement of an object may be stored locally in computing system 100, such as in data store 116. In the example of FIG. 3, the object is an image of firmware, such as may be associated with BIOS 104. At 302, a run-time reference measurement of the firmware may be taken in computing system 100, such as by creating an SHA-1, RSA, or HMAC hash-key summary of the firmware. The reference measurement may be stored at 304 in a trusted memory element or storage, such as PCRs of TPM 110 in computing system 100. In a pre-operating system environment, the reference measurement may be retrieved at 306. BIOS 104, for example, may take the reference measurement from TPM 110 during POST. The reference measurement may then be passed to a microcontroller or application specific integrated circuit at 308. In one example embodiment, BIOS 104 may pass the measurement to BMC 112. The reference measurement may then be compared with the local gold measure at 310. In this context, a local gold measure is any gold measure that may be accessed without a network connection. Thus, BMC 112 may compare a measurement against a gold measure in data store 116, for example. If a variance between the measurement and the gold measure is detected at 310, a remedial action or other policy action may be taken at 312.

Figure 4:
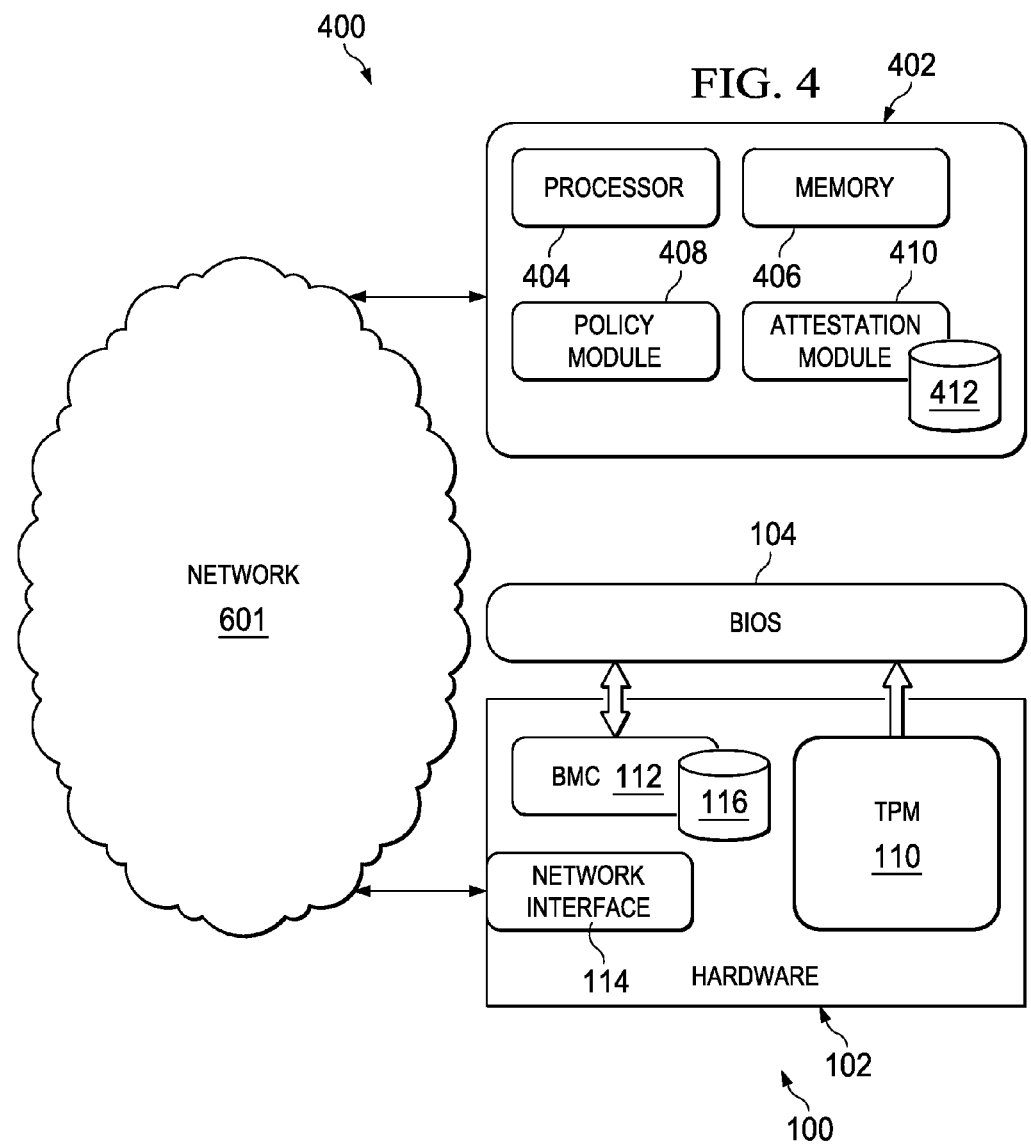
FIG. 4 is a simplified block diagram of an alternative example embodiment of the computing system in a datacenter environment.

FIG. 4 is a simplified block diagram of an alternative example embodiment of computing system 100, which is being provisioned in a datacenter environment 400. In this example embodiment, computing system 100 may be linked via network interface 114 and a local area network 401 to a system manager 402. System manager 402 may include a processor 404 and a memory 406, as well as additional hardware, firmware, and/or software such as policy module 408, attestation module 410, and data store 412.

Datacenter environment 400 can offer a flexible architecture that can readily be adapted to accommodate higher expectations for growth, consolidation, and security. In general terms, a datacenter environment may include a core layer of high-end switches and high-speed cables such as fiber cables. The core layer is generally responsible for fast and reliable transportation of data across an enterprise network. A datacenter may also provide an aggregation layer of routers and layer 3 switches to ensure that packets are properly routed. An access layer may include hubs and switches and may connect nodes (e.g., computing system 100) to a network (e.g., network 401).

Datacenter environment 400 may use redundant switches at each layer for device-level failover that creates a highly available transport between end nodes using the network. Datacenter networks often require additional services beyond basic packet forwarding, such as server load balancing, firewall, or intrusion prevention. These services might be introduced as modules populating a slot of one of the switching nodes in the network, or as standalone appliance devices. Each of these service approaches also supports the deployment of redundant hardware to preserve the high availability standards set by the network topology.

Each of the elements of FIG. 4 may couple to one another through simple interfaces or through any other suitable connection, which provides a viable pathway for network communications. Additionally, any one or more of these elements may be combined or removed from the architecture based on particular configuration needs. Datacenter environment 400 may include a configuration capable of Ethernet communications, and may also operation in conjunction with transmission control protocol/Internet protocol (TCP/IP) communications for the transmission or reception of packets in a network flow. Datacenter environment 400 may also operate in conjunction with a user datagram protocol/IP (UDP/IP), Fibre Channel over Ethernet (FCoE), or any other suitable protocol where appropriate and based on particular needs. Input/output (I/O) may be consolidated in datacenter environment 400 so that the same physical infrastructure can carry different types of traffic, which typically have very different traffic characteristics and transmission requirements.

Figure 5:
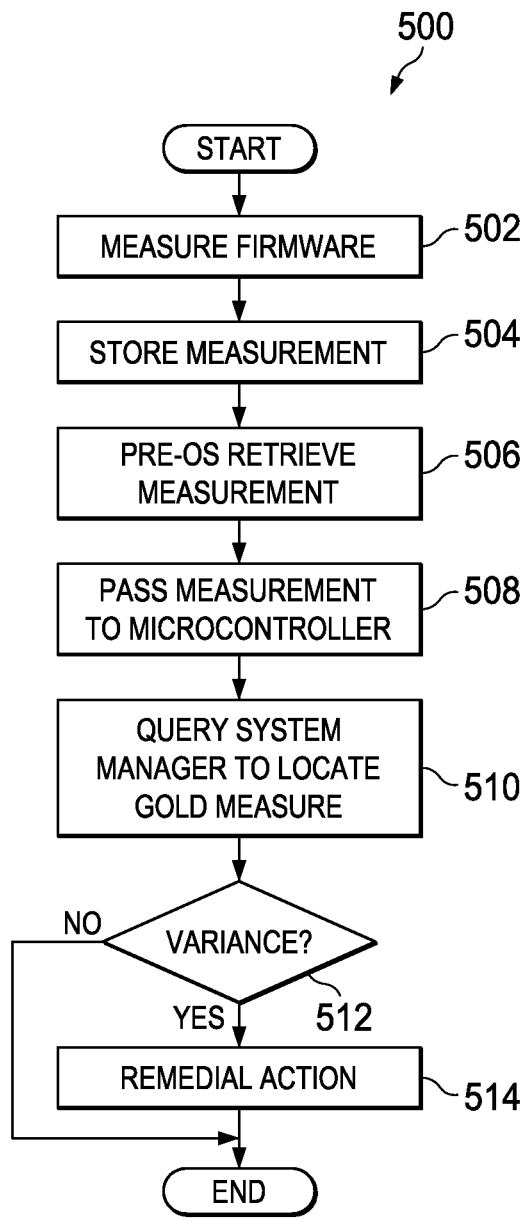
FIG. 5 is a simplified flow diagram illustrating potential operations that may be associated with example embodiments of the computing system and the datacenter environment.

FIG. 5 is a simplified flow diagram 500 illustrating potential operations that may be associated with example embodiments of computing system 100 and datacenter environment 400. Such operations may, for example, be implemented in a BIOS and a BMC, such as BIOS 104 and BMC 112 in computing system 100, and a system manager, such as in policy module 408, attestation module 410, and data store 412 of system manager 402.

As a preliminary matter, a golden measurement of an object (e.g., firmware) may be stored locally in computing system 100, such as in data store 116, or locally in system manager 402, such as in data store 412. At 502, a reference measurement of the firmware may be taken in computing system 100, such as by creating an SHA-1, RSA, or HMAC hash-key summary of the firmware. The reference measurement may be stored at 504, in PCRs of TPM 110 for example. In a pre-operating system environment, the reference measurement may be retrieved at 506. BIOS 104, for example, may take the reference measurement from TPM 110 during POST. The reference measurement may then be passed to a microcontroller or application specific integrated circuit at 508.

In one example embodiment, BIOS 104 may pass the reference measurement to BMC 112. At 510, the microcontroller may query a system manager to locate a local gold measure. In this context, a local gold measure is any gold measure that may be accessed in a datacenter environment without an external network connection. In some embodiments, it may be accessed over a local area network connection, such as network 401. For example, BMC 112 may contact system manager 402, and policy module 408 may determine that gold measures are stored in data store 412 and an encrypted copy of the reference measurement may be passed to attestation module 410. In another example, policy module 408 may determine that local gold measures are stored in data store 116.

The reference measurement may be compared with the local gold measure at 512. Thus, in one embodiment BMC 112 may compare the reference measurement against a gold measure in data store 116, while in other embodiments attestation module 410 may compare the reference measurement against a gold measure in data store 412, depending upon policy applied by policy module 408, for example. If a difference between the measurement and the gold measure is detected at 512, a remedial action or other policy action may be taken at 514.

Figure 6:
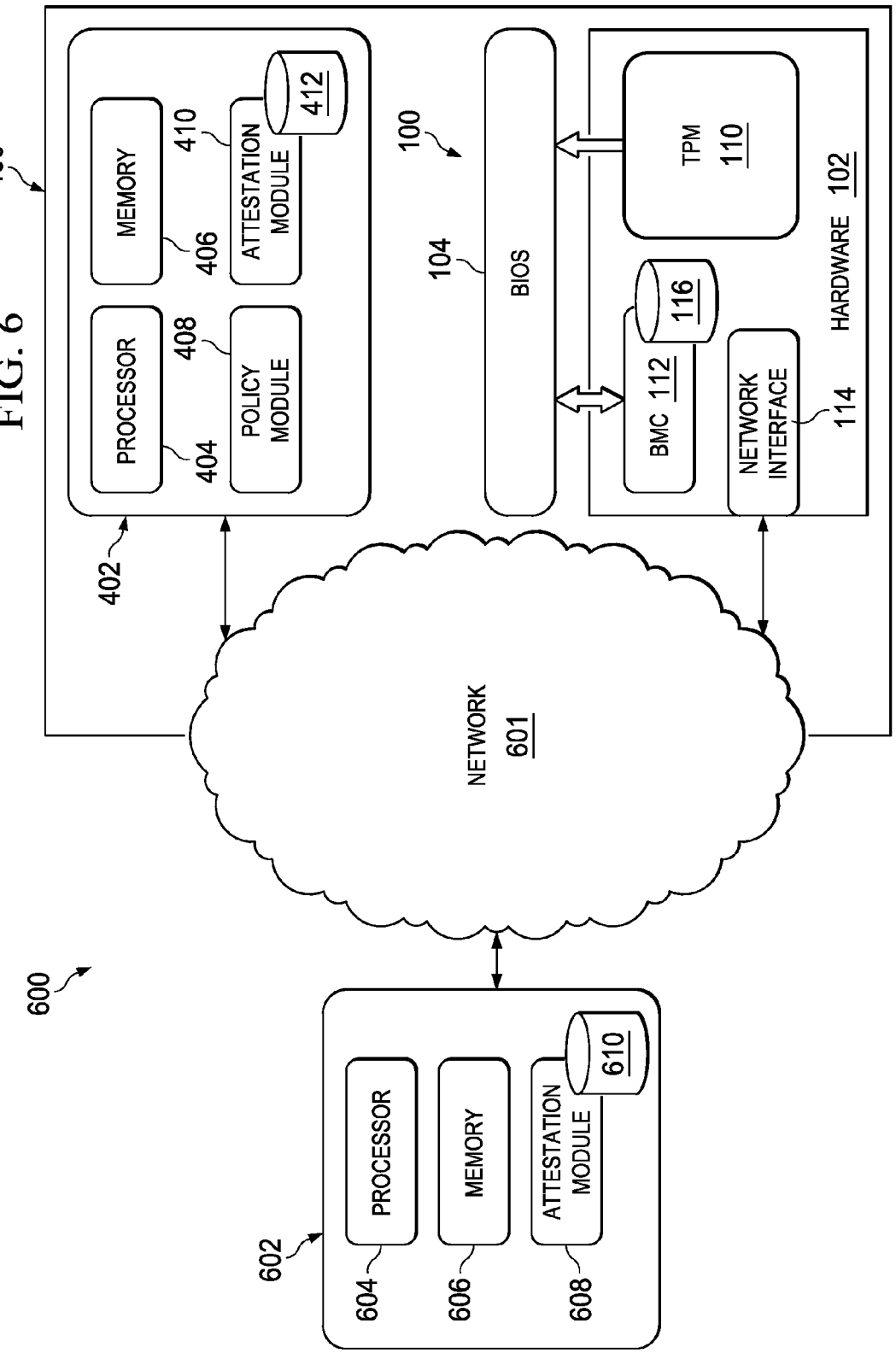
FIG. 6 is a simplified block diagram of yet another alternative example embodiment of the computing system in a network environment.

FIG. 6 is a simplified block diagram of yet another alternative example embodiment of computing system 100 in a network environment 600. In this example embodiment, computing system 100 may be linked via network interface 114 and network 601 to an attestation server 602 and/or system manager 402. Attestation server 602 may include a processor 604 and a memory 606, as well as additional hardware, firmware, and/or software such as attestation module 608, and data store 610.

Each of the elements of FIG. 6 may couple to one another through simple interfaces or through any other suitable connection, which provides a viable pathway for network communications. Additionally, any one or more of these elements may be combined or removed from the architecture based on particular configuration needs. Network environment 600 may include a configuration capable of Ethernet communications, and may also operation in conjunction with transmission control protocol/Internet protocol (TCP/IP) communications for the transmission or reception of packets in a network flow. Network environment 600 may also operate in conjunction with a user datagram protocol/IP (UDP/IP), Fibre Channel over Ethernet (FCoE), or any other suitable protocol where appropriate and based on particular needs.

Figure 7:
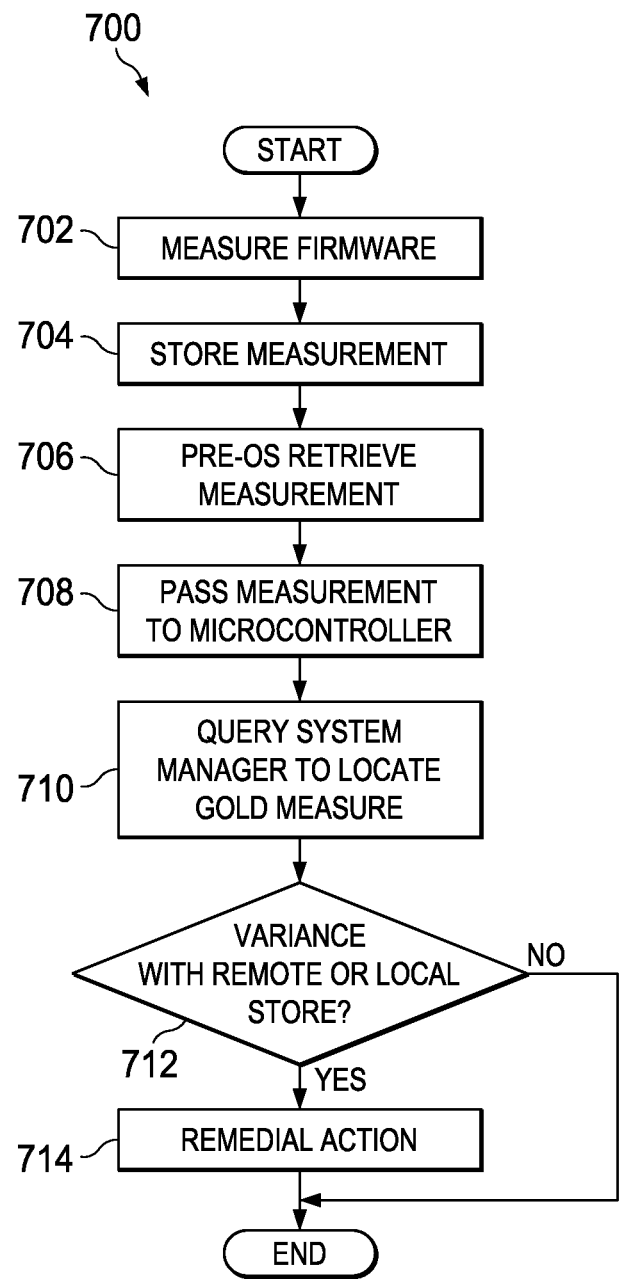
FIG. 7 is a simplified flow diagram illustrating potential operations that may be associated with example embodiments of the computing system and the network environment.

FIG. 7 is a simplified flow diagram 700 illustrating potential operations that may be associated with example embodiments of computing system 100 and network environment 600. Such operations may, for example, be implemented in a BIOS and a BMC, such as BIOS 104 and BMC 112 in computing system 100, in a system manager, such as in policy module 408, attestation module 410, and data store 412 in system manager 402, and in an attestation server, such as in attestation module 608 and data store 610 of attestation server 602.

As a preliminary matter, a golden measurement of firmware (or another object) may be stored remotely in attestation server 602, such as in data store 610, locally in computing system 100, such as in data store 116, or locally in system manager 402, such as in data store 412. At 702, a reference measurement of the firmware may be taken in computing system 100, such as by creating an SHA-1, RSA, or HMAC hash-key summary of the firmware. The reference measurement may be stored at 704, in PCRs of TPM 110 for example. In a pre-operating system environment, the reference measurement may be retrieved at 706. BIOS 104, for example, may take the reference measurement from TPM 110 during POST.

The reference measurement may then be passed to a microcontroller or application specific integrated circuit at 708. In one example embodiment, BIOS 104 may pass the measurement to BMC 112. At 710, the microcontroller may query a system manager to locate a gold measure. For example, BMC 112 may contact system manager 402, and policy module 408 may determine that gold measures are stored in data store 412. In another example, policy module 408 may determine that gold measures are stored in data store 116. In yet another embodiment, policy module 408 may determine that gold measures are stored in data store 610. In other embodiments, microcontroller may be configured with an a priori location for gold measures, and may accordingly omit or bypass a query to a system manager.

An encrypted copy of the reference measurement may be passed to an attestation service and compared with a remote or local gold measure at 712. In this context, a local gold measure is any gold measure that may be accessed over a local area network connection or without network connection, and a remote gold measure includes any gold measure that may be accessed through an external network connection (e.g., a wide area network such as network 601 or the Internet). Thus, BMC 112 may compare a reference measurement against a local gold measure in data store 116 in some embodiments, while in other embodiments attestation module 410 may compare a reference measurement with a local gold measure in data store 412. In yet other embodiments, attestation module 608 may compare the reference measurement with a remote gold measure in data store 610, depending upon policy applied by policy module 408, for example. If a difference between the measurement and the gold measure is detected at 712, a remedial action or other policy action may be taken at 714.

Computing system 100, datacenter environment 400 and/or network environment 600, may include suitable network elements or nodes to facilitate communications and operations, including network appliances, servers, routers, switches, gateways, bridges, load balancers, modules, or any other device, component, element, or object operable to exchange information in such environments. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with elements of computing system 100, datacenter environment 400, and/or network environment 600, each can include memory elements for storing information to be used in the operations outlined herein. Moreover, each element may include one or more interfaces, such as network interface 114, and such interfaces may also include appropriate memory elements. Each element may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory elements discussed herein should be construed as being encompassed within the broad term "memory element" or "memory." Information being used, tracked, sent, or received could be provided in any database, register, queue, table, cache, control list, or other storage structure, all of which can be referenced at any suitable timeframe. Any such storage options may be included within the broad term "memory element" or "memory" as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements can store data used for the operations described herein. This includes the memory elements being able to store software, logic, code, or processor instructions that are executed to carry out the activities described herein.

In one example implementation, computing system 100, system manager 402, attestation server 602, and others may include firmware and/or software modules (e.g., attestation module 210, attestation module 410, policy module 408, etc.) to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, firmware, software, components, modules, interfaces, or objects that facilitate the operations thereof.

Additionally, each of computing system 100, system manager 402, attestation server 602, and others may include one or more processors (or virtual processors) that can execute software or an algorithm to perform activities as discussed herein. A processor, virtual processor, logic unit, or other processing unit can execute any type of instructions associated with the data to achieve the operations detailed herein. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor."

As described herein, embodiments of computing system 100, system manager 402, attestation server 602, and/or other elements can provide certain advantages, some of which have already been discussed. For example, computing system 100 can provide self-contained, out-of-band, and "real-time" firmware attestation for a platform in a managed environment without an agent running in an operating system on the platform or a remote third-party attestation server. Moreover, computing system 100 can substantially eliminate or reduce the transmission of measurements across a network, particularly an external network. This out-of-band attestation can provide faster responses and detection of issues, and be used independently or can augment a platform's security stance without affecting in-band or agent-based attestation.

In the examples provided above, as well as numerous other potential examples, interaction may be described in terms of two, three, or four elements. However, the number of elements has been limited for purposes of clarity and example only. In certain cases, it may be easier to describe one or more of the functionalities of a given set of operations by only referencing a limited number of elements. It should be appreciated that computing system 100, datacenter environment 400, and/or network environment 600 are readily scalable and can accommodate a large number of components, as well as more complicated/sophisticated arrangements and configurations. Accordingly, the examples provided should not limit the scope or inhibit the broad teachings of computing system 100, datacenter environment 400, and/or network environment 600 as potentially applied to a myriad of other architectures. Additionally, although described with reference to particular scenarios, where a particular module is provided within a network element, these modules can be provided externally, or consolidated and/or combined in any suitable fashion. In certain instances, such modules may be provided in a single proprietary unit.

It is also important to note that the appended diagrams illustrate only some of the possible scenarios and patterns that may be executed by or within computing system 100, datacenter environment 400, and/or network environment 600. For example, some operations may be deleted or removed where appropriate, or these operations may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by computing system 100, datacenter environment 400, and/or network environment 600 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method to be performed by a baseboard management controller (BMC) for verifying firmware integrity in a computing system, the method comprising:
   receiving a run-time reference measurement of a firmware object from a basic input/output system (BIOS), wherein the reference measurement is stored in a trusted platform module and the reference measurement is retrieved by the BIOS during a power-on self-test (POST);
   querying a system manager to locate a golden measurement, wherein the golden measurement is associated with the firmware in a guaranteed trust state;
   accessing the golden measurement of the firmware object based on the query, wherein the BMC can bypass the querying the system manager when the BMC is configured with the location of the golden measurement; and
   comparing the reference measurement with the golden measurement during a pre-operating system environment, wherein a policy action is applied when a variance is detected between the reference measurement and the golden measurement.

2. The method of claim 1, wherein the computing system is associated with a datacenter environment, and the BMC access the golden measurement in the datacenter environment without an external network connection.

3. The method of claim 2, wherein the golden measurement is stored in a storage element of the computing system, the computing system includes the trusted platform module, and the BMC accesses the golden measurement without any network connection.

4. The method of claim 2, wherein the computing system includes the trusted platform module, the golden measurement is stored in a storage element of the system manager linked to the computing system via a local area network connection, and the BMC accesses the golden measurement over the local area network connection.

5. The method of claim 1, wherein the querying includes determining whether the golden measurement is stored in a system manager storage element of the system manager, or a storage element of the computing system linked to the system manager, or a storage element of an attestation server, wherein the computing system includes the trusted platform module.

6. The method of claim 1, wherein the BMC is collocated with the trusted platform module in the computing system.

7. A non-transitory media encoded with logic that includes code for execution and when executed by a processor associated with a baseboard management controller (BMC) for verifying firmware integrity in a computing system is operable to perform operations comprising:
   receiving a run-time reference measurement of a firmware object from a basic input/output system (BIOS), wherein the reference measurement is stored in a trusted platform module and the reference measurement is retrieved by the BIOS during a power-on self-test (POST);
   querying a system manager to locate a golden measurement, wherein the golden measurement is associated with the firmware in a guaranteed trust state;
   accessing the golden measurement of the firmware object based on the query, wherein the BMC can bypass the querying the system manager when the BMC is configured with the location of the golden measurement; and
   comparing the reference measurement with the golden measurement during a pre-operating system environment, wherein a policy action is applied when a variance is detected between the reference measurement and the golden measurement.

8. The non-transitory media of claim 7, wherein the computing system is associated with a datacenter environment, and the golden measurement is accessed in the datacenter environment without an external network connection.

9. The non-transitory media of claim 8, wherein the golden measurement is stored in a storage element of the computing system that includes the trusted platform module, and the golden measurement is accessed without any network connection.

10. The non-transitory media of claim 8, wherein the golden measurement is stored in a storage element of the system manager, and the golden measurement is accessed over a local area network connection.

11. The non-transitory media logic of claim 7, wherein the querying includes determining whether the golden measurement is stored in a system manager storage element of the system manager, a storage element of the computing system linked to the system manager, or a storage element of an attestation server, wherein the computing system includes the trusted platform module storage.

12. The non-transitory media logic of claim 7, wherein the BMC is collocated with the trusted platform module in the computing system.

13. A computing system comprising:
   a basic input/output system (BIOS);
   a trusted platform module configured to communicate with the BIOS; and
   a baseboard management controller (BMC) configured to communicate with the BIOS to verify firmware integrity in the computing system, the BMC configured to:
      receive a run-time reference measurement of a firmware object from the BIOS, wherein the reference measurement is stored in the trusted platform module and the reference measurement is retrieved by the BIOS during a power-on self-test (POST);
      query a system manager to locate a golden measurement, wherein the golden measurement is associated with the firmware in a guaranteed trust state;
      access the golden measurement of the firmware object based on the query, wherein the BMC can bypass the querying the system manager when the BMC is configured with the location of the golden measurement; and
      compare the reference measurement with the golden measurement during a pre-operating system environment, wherein a policy action is applied when a variance is detected between the reference measurement and the golden measurement.

14. The apparatus of claim 13, wherein the computing system is associated with a datacenter environment, and the golden measurement is accessed in the datacenter environment without an external network connection.

15. The computing system of claim 14, further comprising a storage element where the golden measurement is stored, wherein the BMC accesses the golden measurement is without any network connection.

16. The computing system of claim 14, wherein the golden measurement is stored in a storage element of the system manager, and the BMC accesses the golden measurement over a local area network connection.

17. The computing system of claim 13, wherein the query includes receiving a determination that the golden measurement is stored in a system manager storage element of the system manager, a storage element of the computing system linked to the system manager, or a storage element of an attestation server.

* * * * *